US00RE43927E

(19) United States
(12) Reissued Patent
Buehler

(10) Patent Number: US RE43,927 E
(45) Date of Reissued Patent: Jan. 15, 2013

(54) VEHICLE IMPACT ATTENUATOR

(75) Inventor: Michael J. Buehler, Roseville, CA (US)

(73) Assignee: Energy Absorption Systems, Inc., Dallas, TX (US)

(21) Appl. No.: 10/931,242

(22) Filed: Aug. 31, 2004

Related U.S. Patent Documents

Reissue of:
(64) Patent No.: 6,623,204
Issued: Sep. 23, 2003
Appl. No.: 10/232,140
Filed: Aug. 29, 2002

U.S. Applications:
(62) Division of application No. 09/753,476, filed on Jan. 3, 2001, now Pat. No. 6,461,076.

(51) Int. Cl.
*E01F 13/00* (2006.01)
(52) U.S. Cl. ..... 404/6; 404/10; 256/13.1
(58) Field of Classification Search ..... 404/6, 9, 404/10; 188/372; 256/13.1
See application file for complete search history.

(56) References Cited

U.S. PATENT DOCUMENTS

| | | | | |
|---|---|---|---|---|
| 2,088,087 | A | 7/1937 | Hudson | 256/1 |
| 3,643,924 | A | 2/1972 | Fitch | 256/13.1 |
| 3,674,115 | A | 7/1972 | Young et al. | 404/6 |
| 3,680,662 | A | 8/1972 | Walker et al. | 188/377 |
| 3,693,940 | A | 9/1972 | Kendall et al. | 256/1 |
| 3,768,781 | A | 10/1973 | Walker et al. | |
| 3,845,936 | A | 11/1974 | Boedecker, Jr. et al. | |
| 3,856,268 | A | 12/1974 | Fitch | 256/13.1 |
| 3,880,404 | A | 4/1975 | Fitch | |
| 3,919,380 | A | 11/1975 | Smarook et al. | 264/164 |
| 3,982,734 | A | 9/1976 | Walker | 256/13.1 |
| 4,084,914 | A | 4/1978 | Humphrey et al. | 404/10 |
| 4,190,275 | A | 2/1980 | Mileti | 293/102 |
| 4,200,310 | A | 4/1980 | Carney, III | |
| 4,307,973 | A | 12/1981 | Glaesener | 404/6 |
| 4,321,989 | A | 3/1982 | Meinzer | 188/377 |
| 4,352,484 | A | 10/1982 | Gertz et al. | 256/13.1 |
| 4,399,980 | A | 8/1983 | van Schie | 256/13.1 |
| 4,407,484 | A | 10/1983 | Meizner | 256/13.1 |
| 4,452,431 | A | 6/1984 | Stephens et al. | 256/13.1 |
| 4,583,716 | A | 4/1986 | Stephens et al. | 256/13.1 |
| 4,596,489 | A | 6/1986 | Mariol et al. | 404/10 |
| 4,635,981 | A | 1/1987 | Friton | 293/1 |

(Continued)

FOREIGN PATENT DOCUMENTS

DE 3106694 A1 9/1982

(Continued)

OTHER PUBLICATIONS

"QuadGuard®, A Proven-Effective Crash Cushion", *Energy Absorption Systems, Inc.*, 2000, pp. 1-37.

(Continued)

*Primary Examiner* — Raymond W Addie
(74) *Attorney, Agent, or Firm* — Brinks Hofer Gilson & Lione

(57) ABSTRACT

A vehicle impact attenuator includes a rail and at least one guide member moveable along the rail. At least a portion of the guide member is rotatable relative to the rail about a vertical axis by at least ±10° without binding the guide member against the rail. At least one energy absorbing element is located adjacent said guide member. A method of attenuating the impact of a vehicle is also provided.

41 Claims, 8 Drawing Sheets

U.S. PATENT DOCUMENTS

| | | | | |
|---|---|---|---|---|
| 4,645,375 | A | 2/1987 | Carney, III | 404/6 |
| 4,674,911 | A | 6/1987 | Gertz | 404/6 |
| 4,711,481 | A | 12/1987 | Krage et al. | 293/133 |
| 4,723,758 | A | 2/1988 | Gehrig | 256/13.1 |
| 4,784,515 | A | 11/1988 | Krage et al. | 404/6 |
| 4,815,565 | A | 3/1989 | Sicking et al. | 188/32 |
| 4,844,213 | A | 7/1989 | Travis | 188/377 |
| 5,011,326 | A | 4/1991 | Carney, III | 404/6 |
| 5,054,954 | A | 10/1991 | Cobb et al. | 404/6 |
| 5,112,028 | A | 5/1992 | Laturner | 256/13.1 |
| 5,125,762 | A | 6/1992 | Strassil | 404/6 |
| 5,248,129 | A | 9/1993 | Gertz | 256/13.1 |
| 5,403,112 | A | 4/1995 | Carney, III | 404/6 |
| 5,403,113 | A | 4/1995 | Gertz | 404/6 |
| 5,429,449 | A | 7/1995 | Baatz | 404/6 |
| 5,483,917 | A | 1/1996 | Walker | 116/63 P |
| 5,487,619 | A | 1/1996 | Winebrenner | 404/6 |
| 5,607,252 | A | 3/1997 | Tischer | 404/6 |
| 5,718,413 | A | 2/1998 | Nagler | 256/13.1 |
| 5,733,062 | A | 3/1998 | Oberth et al. | 404/6 |
| 5,746,419 | A | 5/1998 | McFadden | 267/140 |
| 5,775,675 | A | 7/1998 | Sicking et al. | 256/13.1 |
| 5,797,592 | A | 8/1998 | Machado | 256/13.1 |
| 5,823,584 | A | 10/1998 | Carney, III | 293/102 |
| 5,851,005 | A | 12/1998 | Muller et al. | 256/13.1 |
| 5,868,521 | A | 2/1999 | Oberth et al. | 404/6 |
| 5,875,875 | A | 3/1999 | Knotts | 188/374 |
| 5,957,435 | A | 9/1999 | Bronstad | 256/13.1 |
| 6,024,341 | A | 2/2000 | Gertz | 256/13.1 |
| 6,076,871 | A | 6/2000 | Jarvis et al. | 293/123 |
| 6,082,926 | A | 7/2000 | Zimmer | 404/6 |
| 6,092,959 | A | 7/2000 | Leonhardt et al. | 404/6 |
| 6,095,716 | A | 8/2000 | Kulp et al. | 404/9 |
| 6,116,805 | A | 9/2000 | Gertz | 256/13.1 |
| 6,126,144 | A | 10/2000 | Hirsch et al. | 256/13.1 |
| 6,168,346 | B1 | 1/2001 | Ernsberger | 404/6 |
| 6,179,516 | B1 | 1/2001 | Ivey et al. | 404/6 |
| 6,203,079 | B1 | 3/2001 | Breed | 293/119 |
| 6,220,575 | B1 | 4/2001 | Lindsay et al. | 256/13.1 |
| 6,276,667 | B1 | 8/2001 | Arthur | 256/13.1 |
| 6,293,727 | B1 | 9/2001 | Albritton | 404/6 |
| 6,308,809 | B1 | 10/2001 | Reid et al. | 188/377 |
| 6,340,268 | B1 | 1/2002 | Alberson et al. | 404/6 |
| 6,375,385 | B1 | 4/2002 | Kennedy | 404/10 |
| 6,427,983 | B1 | 8/2002 | Leonhardt et al. | 256/13.1 |
| 6,461,076 | B1 | 10/2002 | Stephens et al. | 404/6 |
| 6,533,250 | B2 | 3/2003 | Arthur | 256/13.1 |
| 6,536,985 | B2 | 3/2003 | Albritton | 404/6 |
| 6,551,010 | B1 | 4/2003 | Kiedaisch et al. | 404/6 |
| 6,554,529 | B2 | 4/2003 | Stephens et al. | 404/6 |
| 6,637,971 | B1 | 10/2003 | Carney, III et al. | 404/6 |
| 6,863,467 | B2 | 3/2005 | Buehler et al. | 404/6 |
| 2003/0168650 | A1 | 9/2003 | Alberson et al. | 256/13.1 |
| 2005/0084328 | A1 | 4/2005 | Alberson et al. | |

FOREIGN PATENT DOCUMENTS

| | | | |
|---|---|---|---|
| DE | 3809470 | A1 | 10/1989 |
| WO | WO 93/23626 | A1 | 11/1993 |

OTHER PUBLICATIONS

"QuadGuard®, Family of Crash Cushions", *Energy Absorption Systems, Inc.,* Aug. 1997.

"Saving Lives by Design", *Energy Absorption Systems, Inc.,* 1998, pp. 1-15.

AMENDED

VEHICLE IMPACT ATTENUATOR

Matter enclosed in heavy brackets [ ] appears in the original patent but forms no part of this reissue specification; matter printed in italics indicates the additions made by reissue.

*CROSS-REFERENCE TO RELATED APPLICATIONS*

This [application] is a [divisional] *reissue of Ser. No. 10/232,140, filed Aug. 29, 2002, now U.S. Pat. No. 6,623,204 B1, issued Sep. 23, 2003, which is a division* of U.S. patent application Ser. No. 09/753,476, filed Jan. 3, 2001, now U.S. Pat. No. 6,461,076, the entire [disclosure] *disclosures of both* of which [is] *are* hereby incorporated herein by reference.

BACKGROUND

The present invention relates to impact attenuators for vehicles that have left the roadway, and in particular to such attenuators that are well adapted to bring an axially impacting vehicle to a safe stop and to redirect a laterally impacting vehicle that strikes the side of the attenuator.

Carney U.S. Pat. Nos. 4,645,375 and 5,011,326 disclose two stationary impact attenuation systems. Both rely on an array of vertically oriented metal cylinders. In the '375 patent, compression elements 54 are arranged in selected cylinders transverse to the longitudinal axis of the array. In the '326 patent, the cylinders are guided in longitudinal movement by cables extending alongside the cylinders on both outer faces of the array. The individual cylinders are guided along the cables by eye-bolts or U-bolts.

A need presently exists for an improved impact attenuator that provides improved redirection for vehicles impacting the side of the barrier, and that is more easily restored to working condition after an impact.

SUMMARY

By way of introduction, the impact attenuators described below include a central, elongated structure that is designed to resist lateral deflection. Tubes are mounted on either side of this elongated structure to slide along the structure in an axial impact and to react against the structure and redirect the vehicle in a lateral impact. The tubes are formed of a resilient, self-restoring material such as an elastomer or a high-density, high-molecular-weight polyethylene. Compression elements are mounted in the cylinders, and these compression elements are oriented at an angle of about 60° to the longitudinal axis of the array to improve the redirection capabilities of the system.

The foregoing paragraph has been provided by way of general introduction, and it should not be used to narrow the scope of the following claims.

DETAILED DESCRIPTION OF THE PRESENTLY PREFERRED EMBODIMENTS

Figure 1:
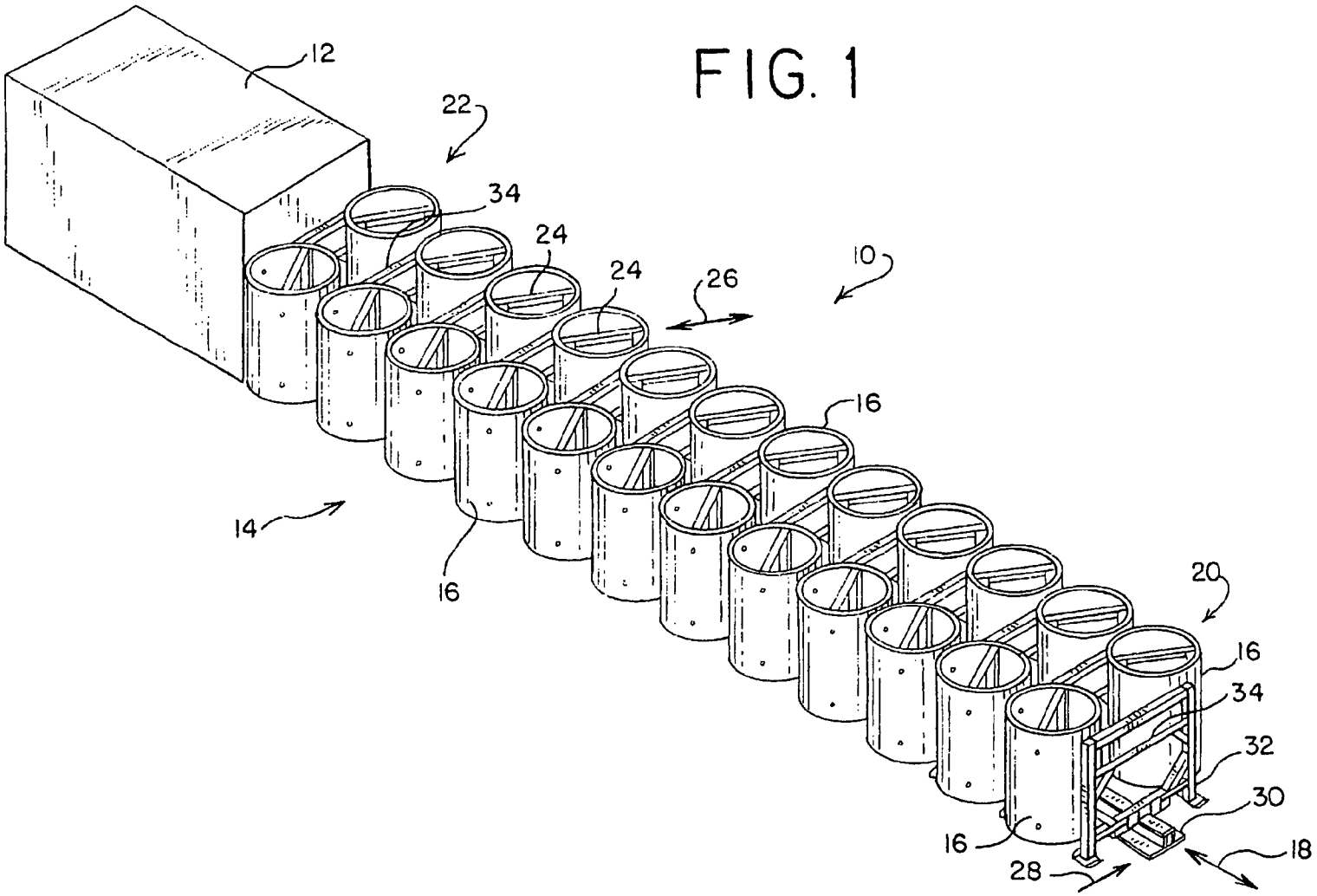
FIG. 1 is a perspective view of an impact attenuator that incorporates a first preferred embodiment of this invention.

FIG. 1 shows an overall view of a vehicle impact attenuator 10 in an initial condition, prior to impact. The attenuator 10 is shown positioned forwardly of a backup 12, which can be any hazard alongside a roadway from which vehicles are to be protected. For example, the backup 12 can be a bridge pier, a wall, or other obstruction positioned alongside the roadway.

The attenuator 10 includes an array 14 of tubes 16. In this embodiment, all of the tubes 16 are cylindrical in shape, and they are oriented with their cylinder axes positioned vertically. The tubes 16 are preferably formed of a resilient, polymeric material, such as high density polyethylene (HDPE), such that the tubes 16 are self-restoring after an impact. As used herein, the term "self-restoring" signifies that the tubes return substantially (though not in all cases completely) to their original condition after at least some impacts. Thus, the tube does not have to return to exactly its original condition to be considered self-restoring.

The array 14 defines a longitudinal axis 18 extending forwardly from the backup 12, and the array 14 includes a front end 20 positioned farther from the backup than the back end 22.

As described in greater detail below, the tubes 16 are secured together and to the backup 12, and at least the majority of the array 14 includes rows of the tubes 16, each row having at least two tubes. In this example, each of the rows includes two adjacent tubes, each disposed on a respective side of the longitudinal axis 18. Each of these tubes includes a compression element 24 that is designed to resist compression of the respective tube 16 along a respective compression axis 26, while allowing elongation of the tube 16 along the same axis 26 and collapse of the tube along the longitudinal axis of the array.

In this embodiment, an elongated structure 28 takes the form of a rail 30 that is secured in place in alignment with the longitudinal axis 18, for example, by bolting the rail 30 to the support surface. This rail may take the form of the rail described in U.S. Pat. No. 5,733,062, assigned to the assignee of the present invention and hereby incorporated by reference. The attenuator 10 also includes a plurality of guides 32. In this embodiment, each of the guides 32 includes a transverse element 34 that is secured to adjacent ones of the tubes 16 and is configured to slide along the length of the rail 30, in an axial impact.

In an axial impact, the transverse elements 34 slide along the rail 30, and the tubes 16 are flattened along the longitudinal direction. Deformation of the tubes 16 absorbs kinetic energy and decelerates the impacting vehicle.

In a lateral impact, the compression elements 24 transfer compressive loads to the transverse elements 34, which in turn transfer these compressive loads to the rail 30. This provides substantial lateral stiffness to the attenuator 10 such that the attenuator 10 redirects an impacting vehicle that strikes the attenuator 10 laterally. Because the guides 32 and the elongated structure 28 are positioned centrally, a vehicle traveling down the side of the attenuator 10 encounters few snagging surfaces that might adversely affect the stability or trajectory of the impacting vehicle.

Figure 2:
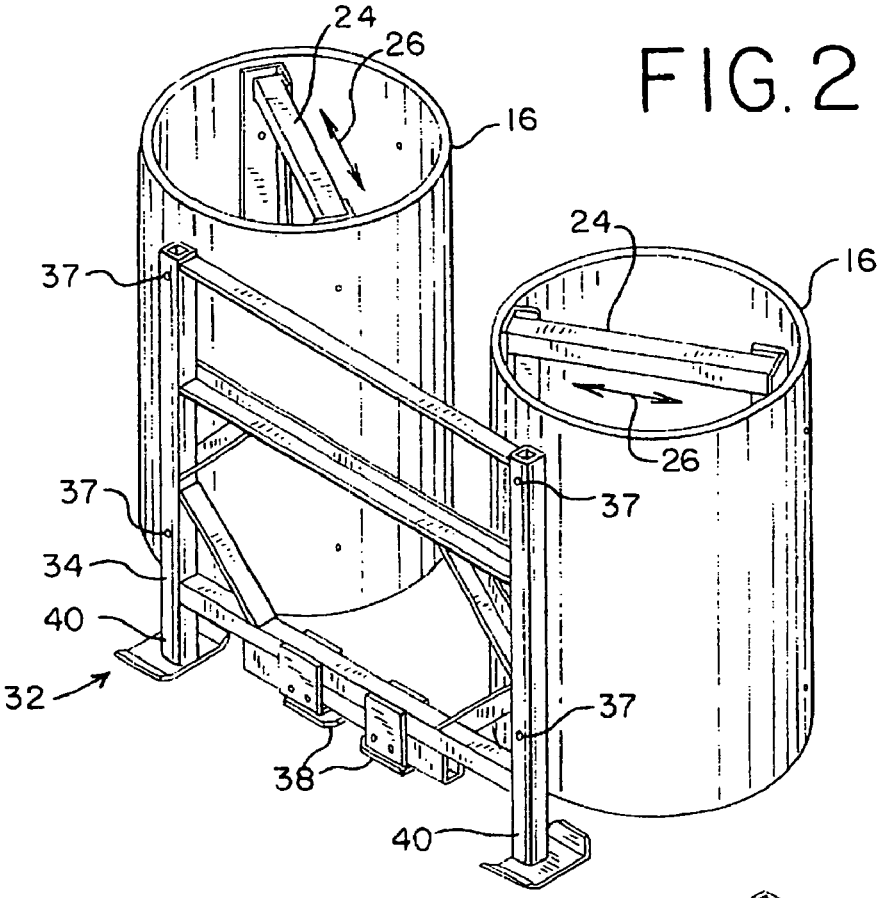
FIG. 2 is a perspective view of a pair of tubes and associated guide and compression elements of the system of FIG. 1.

FIG. 2 provides a more detailed view of selected elements of the attenuator 10. Note that the transverse element 34 in this embodiment is shaped as a frame with substantial stiffness, and that it is provided with plates 38 shaped to fit under an uppermost flange of the rail 30 (FIG. 1) such that the transverse element 34 is restrained from all translation other than axial sliding movement along the length of the rail 30. Each transverse element includes two legs 40 that rest on the support surface on opposite sides of the rail. In the event of a lateral impact, the leg on the side of the rail opposite the impact cooperates with the plates 38 and the rail 30 to resist rotation and lifting of the transverse element 34. Preferably, the plates 38 are shaped to allow twisting of the transverse element 34 about a vertical axis over a desired range (e.g., ±25°) to reduce binding with the rail 30.

Figure 3:
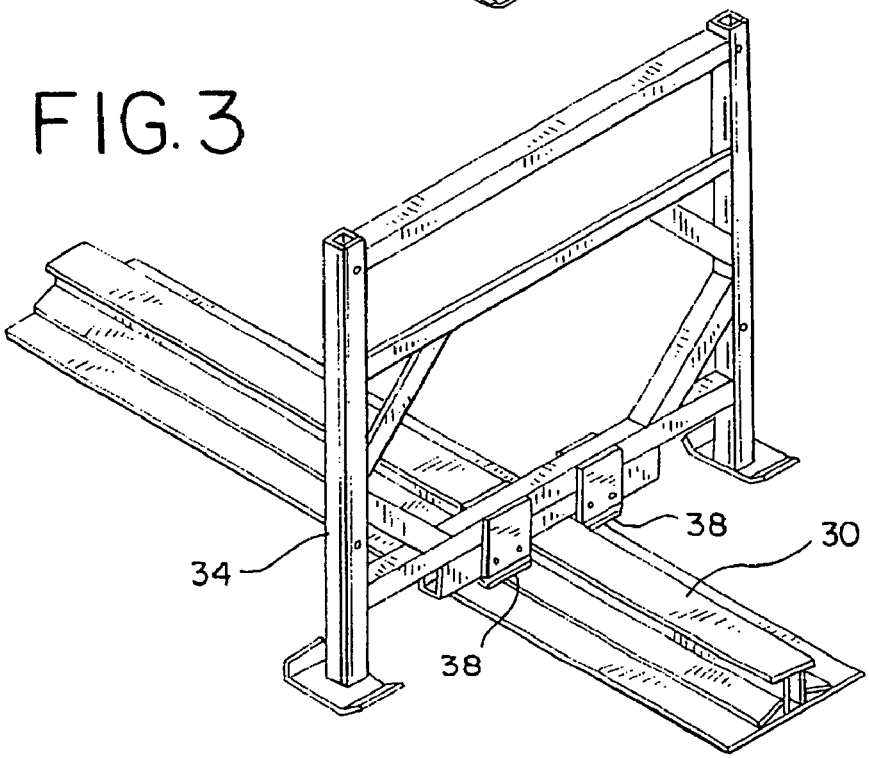
FIGS. 3, 4, 4a, and 5 are perspective, enlarged elevation, perspective, and plan views, respectively, showing portions of one of the transverse elements of FIG. 1.
Figure 4:
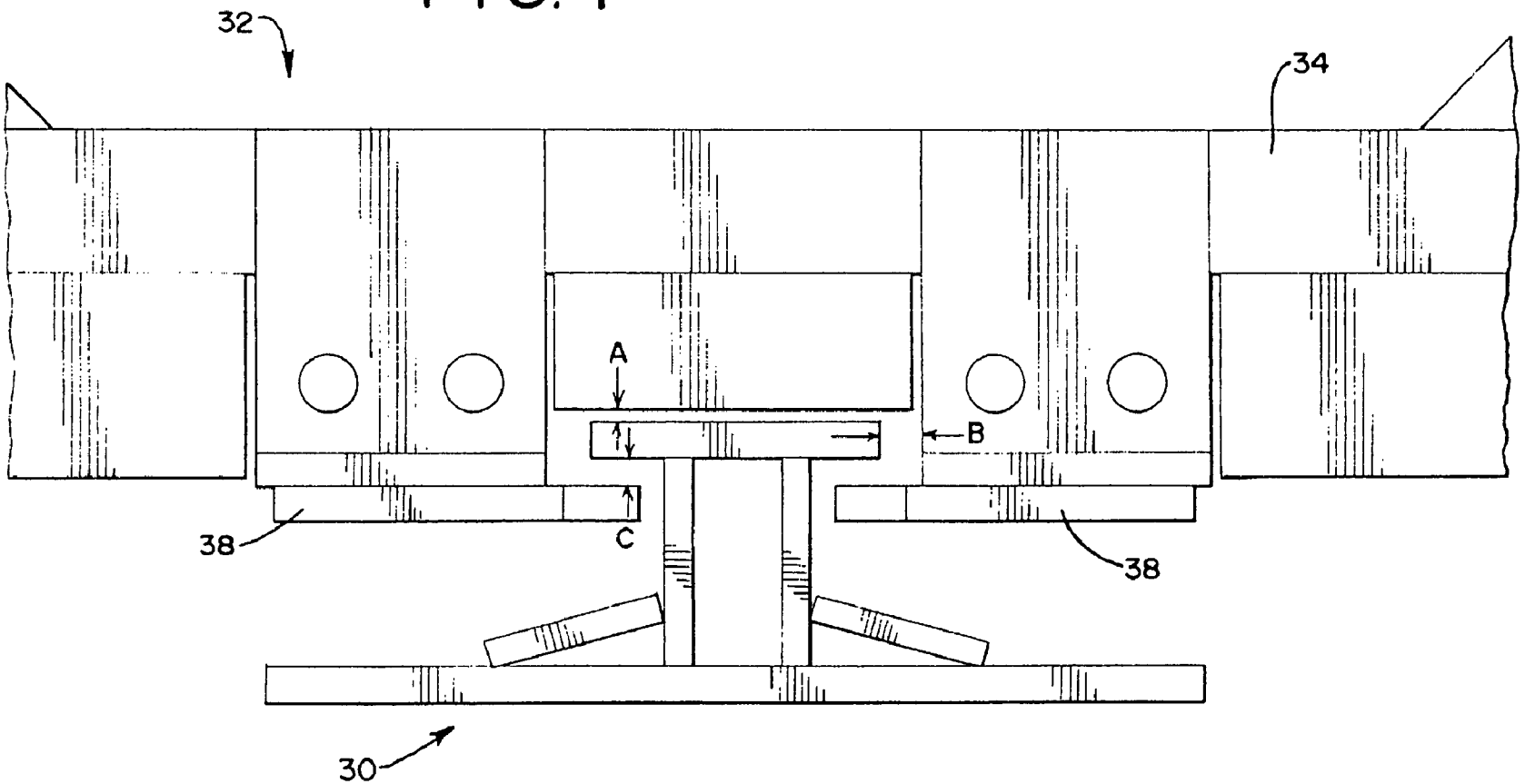
Figure 4A:
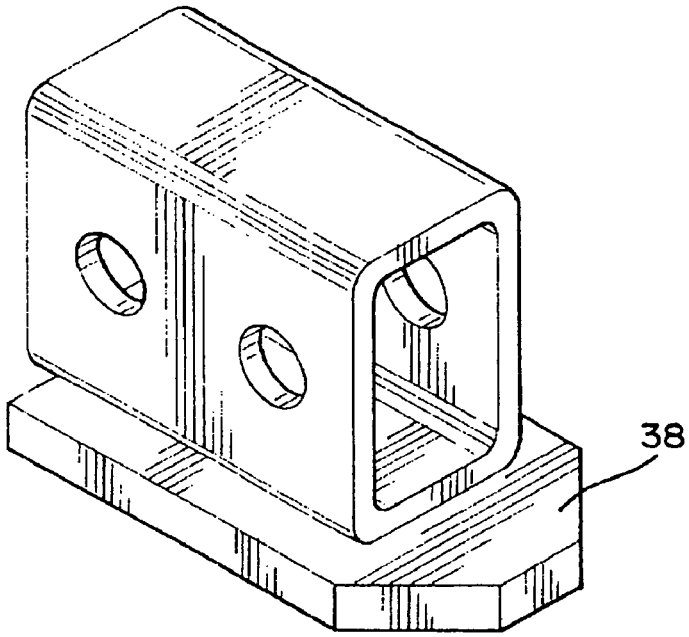

FIGS. 3 and 4 show details of construction of the plates 38 and the rail 30. Note that the fit between the plates 38 and the rail 30 is loose, and this fit allows the desired degree of twisting of the transverse element without binding. The range of allowed twisting is preferably greater than ±10°, more preferably greater than ±20°, and most preferably about ±25°, all measured with respect to the longitudinal axis of the rail 30. The dimensions of Table 1 have been found suitable in one example, in which the plates 38 were shaped as shown in FIG. 4a, and the plates 38 extended 7.6 cm along the rail (including the chamfered corners).

TABLE 1

| Parameter | Dimension (cm) |
|---|---|
| A | 0.47 |
| B | 1.59 |
| C | 1.11 |

Figure 5:
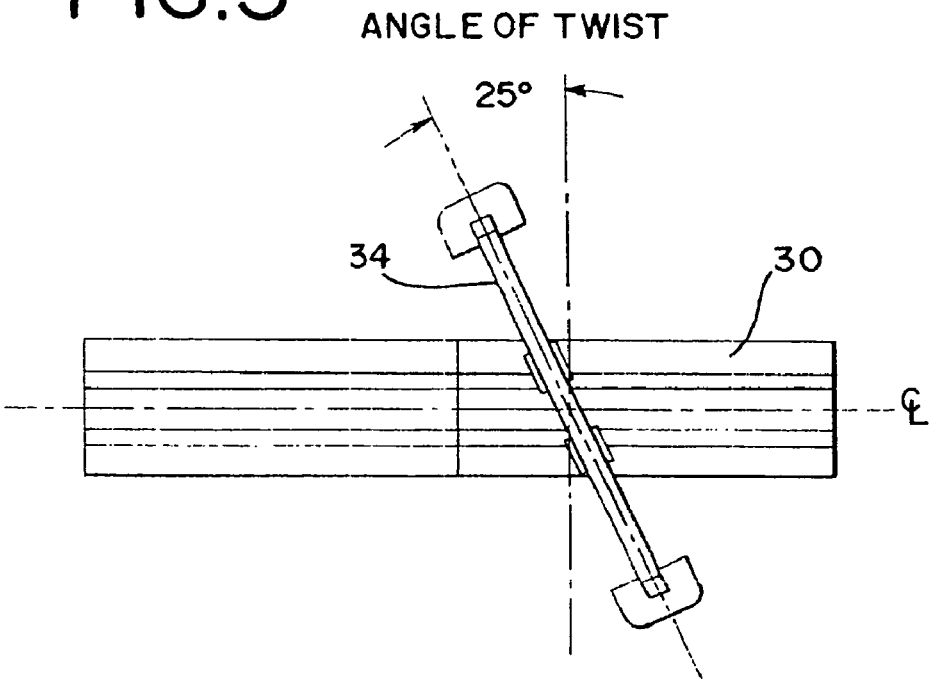

FIG. 5 shows one of the transverse elements 34 twisted by 25° with respect to the rail 30. Many alternatives are possible, including other shapes for the plates 38. For example, the plates 38 may present a curved bullet nose to the rail.

This approach can be used in vehicle impact attenuators of other types, e.g., the attenuator of U.S. Pat. No. 5,733,062, and a wide variety of energy absorbing elements can be used between the transverse elements, including sheet metal elements, foam elements, and composite elements of various types. See, e.g. the energy absorbing elements of U.S. Pat. Nos. 5,733,062, 5,875,875, 4,452,431, 4,635,981, 4,674,911, 4,711,481 and 4,352,484.

Figure 6:
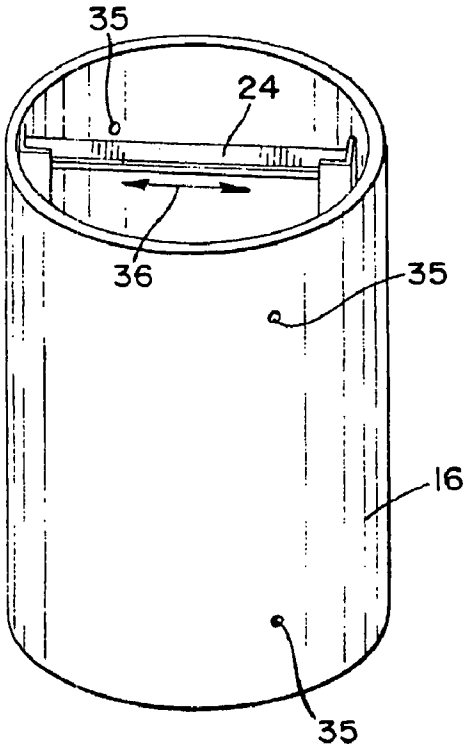
FIG. 6 is a perspective view of one of the tubes of FIG. 1, showing the internal compression element.

As shown in FIG. 2, the tubes 16 are each secured in two places to each adjacent transverse element 34, as for example by suitable fasteners such as bolts passing through the holes 37. Also as shown in FIG. 6, each of the compression elements 24 is secured at one end only to the respective tube 16, as for example by suitable fasteners such as bolts. Each compression element 24 extends substantially completely across the respective tube 16 in the initial condition (e.g., by more than about 80% of the tube diameter), and it is designed to resist compression while allowing extension of the tube 16 along the compression axis 26. As shown in FIG. 6, one end of each of the compression elements 24 is free of tension-resisting attachment to the respective tube 16.

Figure 7:
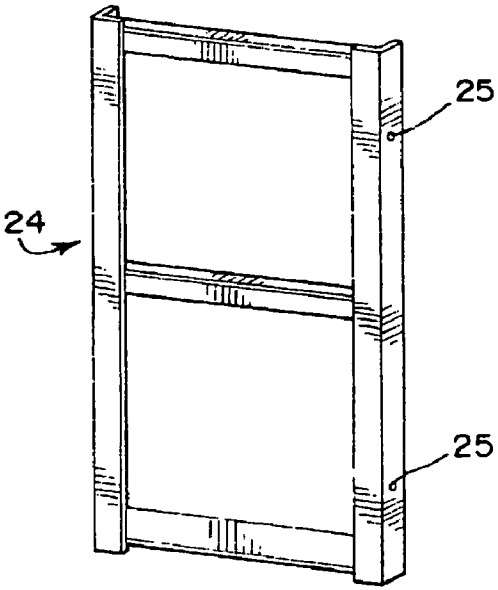
FIG. 7 is a perspective view of the compression element of FIG. 6.

FIG. 6 shows a perspective view of one of the tubes 16 and the associated compression element 24. The compression element 24 is shown in greater detail in FIG. 7. As shown in FIG. 7, the compression element 24 is shaped as a frame in this embodiment, and the compression element includes openings 25 that receive fasteners (not shown) that secure one end only of each compression element 24 to the respective tube 16.

Though FIG. 2 shows only two tubes 16 secured to the transverse element 34, when fully assembled there are a total of four tubes 16 secured to each of the transverse elements 34: two on one side of the rail 30, and two on the other. Thus, each tube 16 is bolted in place between two adjacent transverse elements 34. This arrangement is shown in FIG. 1.

In the event of an axial impact, the impacting vehicle first strikes the front end 20. The momentum of the impacting vehicle causes the transverse elements 34 to slide along the rail 30, thereby compressing the tubes 16 such that they become elongated transverse to the longitudinal axis and flattened along the longitudinal axis. In order to prevent any undesired binding, it is preferred that the tubes 16 within any given row be spaced from one another in an initial condition, e.g., by about one-half the diameter of tubes 16. After the impact, the system can be restored to its original configuration by pulling the forward transverse element 34 away from the backup 12. In many cases, nothing more is required by way of refurbishment.

In the event of a lateral impact at a glancing angle, e.g. 20°, the impacting vehicle will strike the side of the array 14. The compression elements 24 transfer compressive loading to the transverse elements 34, which transfer this compressive loading to the rail 30. In this way, the attenuator 10 provides substantial lateral stiffness and effective redirection of an impacting vehicle.

In the preferred embodiment described above, the orientation of the compression elements at approximately 60° with respect to the longitudinal axis of the array has been found to provide advantages in terms of improved vehicle redirection. In this configuration, the outboard end of each compression element is positioned forwardly of the inboard end of each compression element, at the illustrated angle with the longitudinal axis. Of course, other angles can be used.

In the embodiment of FIGS. 1-7, the array 10 may have a length of 9.1 meters, and each of the tubes may have a height of 102 cm and a diameter of 61 cm. The tubes 16 may be formed of Extra High Molecular Weight Polyethylene resin (e.g., EHMW PE 408 ASTM F714) with a wall thickness of 1.875 (for tubes 16 at the front of the array) and 2.903 cm (for tubes 16 at the rear of the array), all as specified by ASTM F714. All of these dimensions may be varied to suit the particular application.

Figure 8:
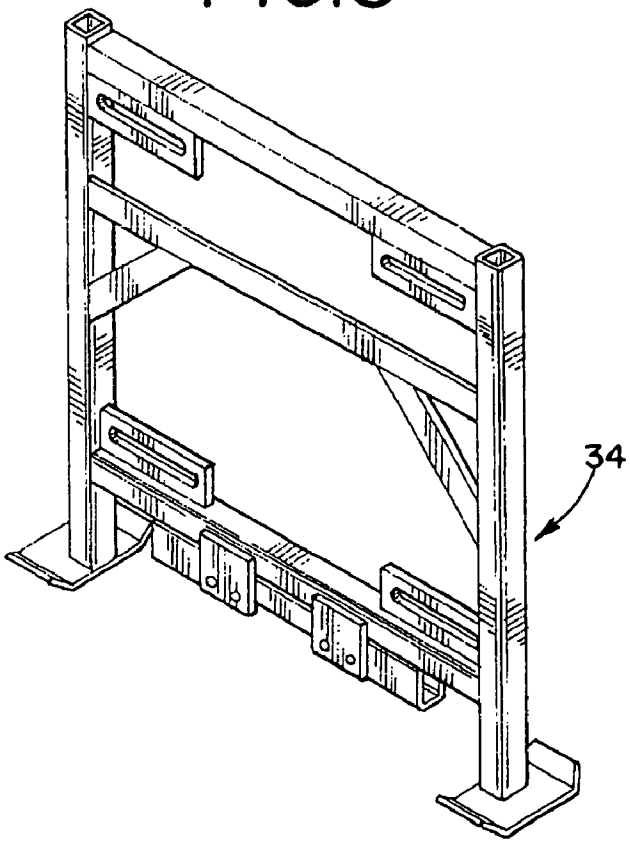
FIG. 8 is a perspective view of portions of an alternative guide that allows sliding attachment between the guide and the adjacent tubes.

Of course, many alternatives are possible to the preferred embodiment described above. FIG. 8 shows an alternative form of the transverse element 34. In this alternative, the transverse element 34 is provided with slots positioned to receive the fasteners that secure the tubes to the transverse element. The slots allow the tubes to move laterally outwardly as necessary during an axial impact to prevent any undesired binding between the tubes within a row at the centerline.

Figure 9:
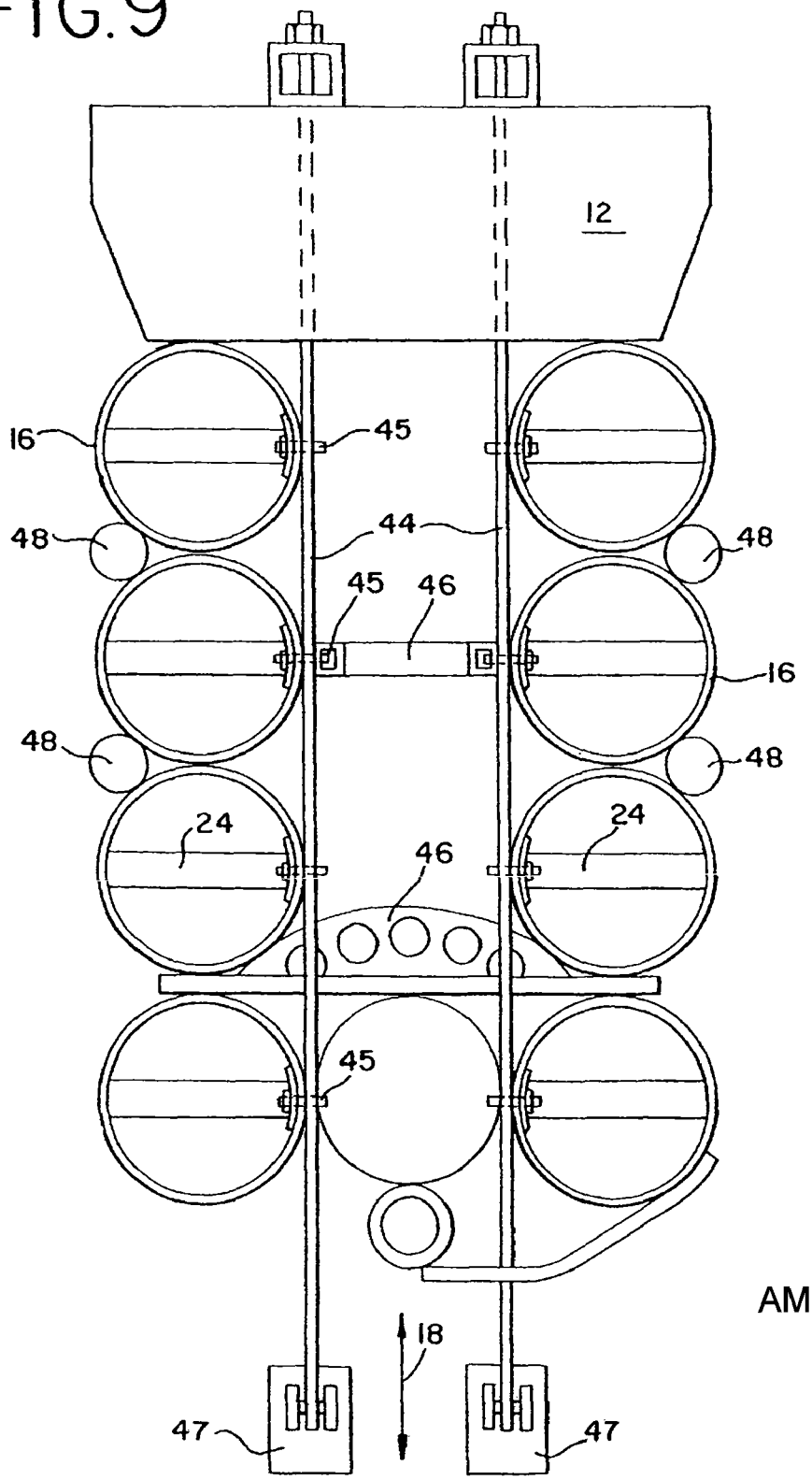
FIG. 9 is a top view of a second preferred embodiment of the impact attenuator of this invention.

FIG. 9 relates to another alternative embodiment in which the elongated structure that provides lateral rigidity is implemented as a set of cables 44. These cables 44 are positioned to support a central portion of the tubes 16, and the tubes 16 are secured to the cables 44 by means of guides 45 that may take the form of eye-bolts or U-bolts. In this example, the compression elements 24 are positioned transversely to the longitudinal axis 18 and are secured to the guides 45. Loadsharing diaphragms 46 are provided to transfer lateral loads from one of the cables to the other. The cables are anchored rearwardly to the backup 12 and forwardly to ground anchors [46] *47*. If desired, extra redirecting cylinders 48 may be positioned between the tubes 16.

Figure 10:
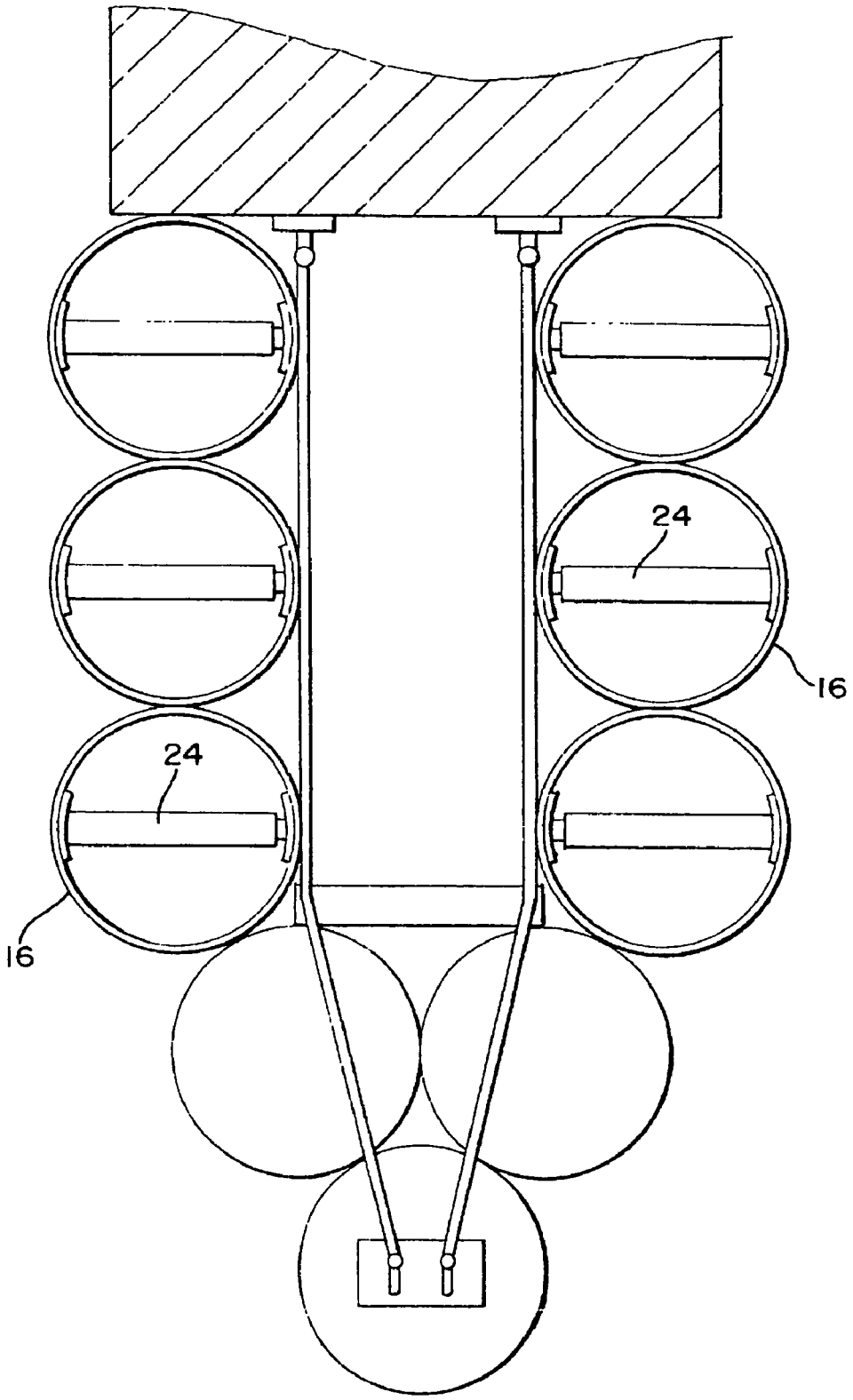
FIGS. 10 and 11 are top views of a third preferred embodiment of the impact attenuator of this invention, before and after axial compression, respectively.
Figure 11:
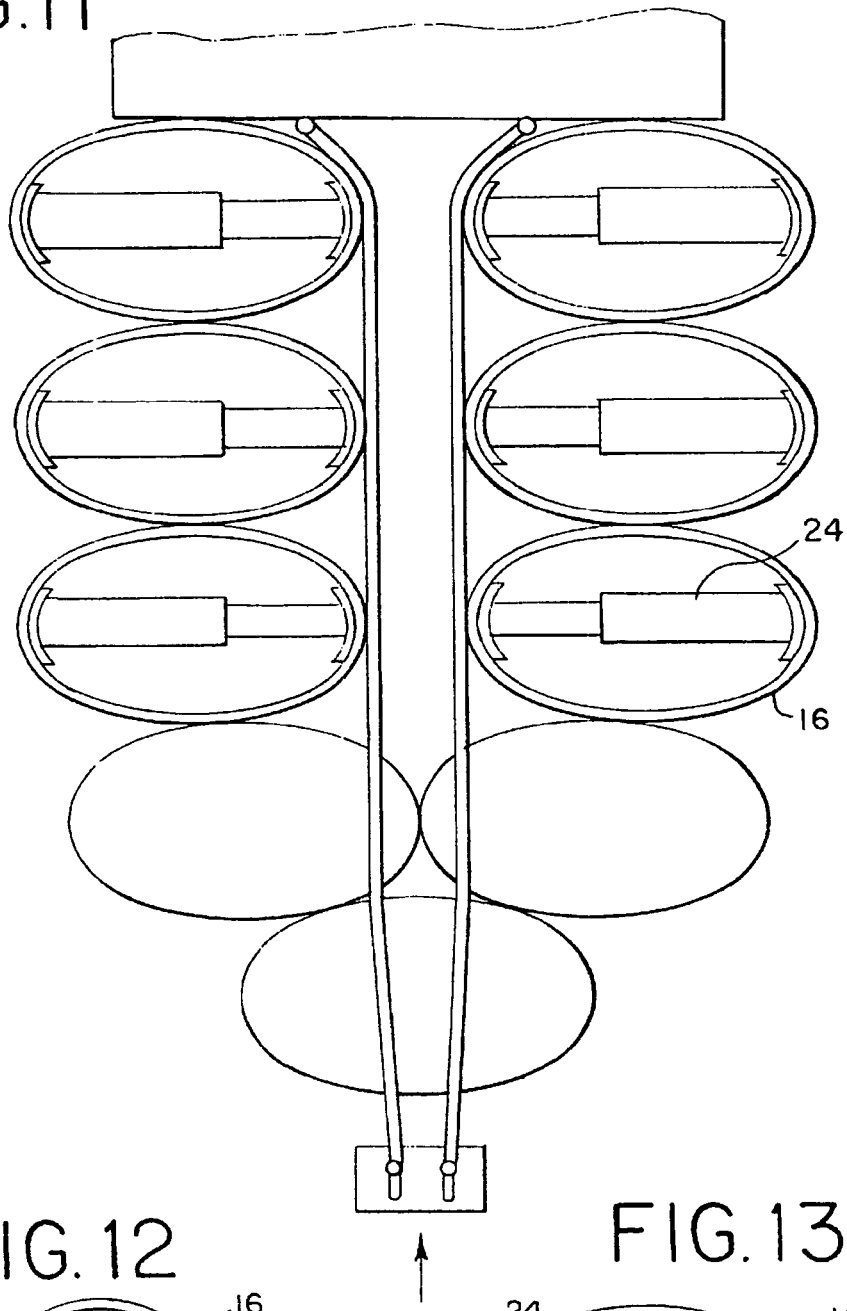

FIGS. 10 and 11 relate to a third embodiment that is similar to the embodiment of FIG. 9 in many ways. FIG. 10 shows the system prior to impact with a vehicle, and FIG. 11 shows the system following an axial impact. Note that the compression elements 24 are designed to resist collapse of the tubes 16 in the lateral direction, while allowing expansion of the tubes 16 in the lateral direction.

Figure 12:
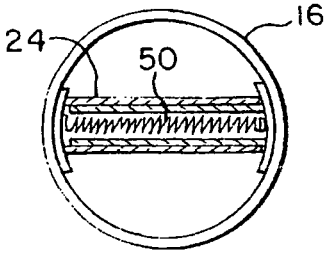
FIGS. 12 and 13 are top views of one of the cylinders of FIGS. 10 and 11 and the associated compression element, before and after axial compression, respectively.
Figure 13:
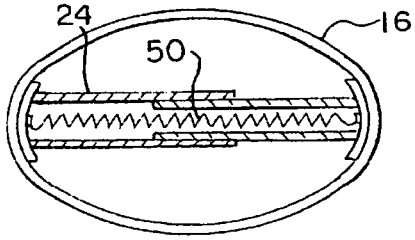

The embodiment of FIGS. 10 and 11 uses a modified compression element 24 that is telescoping and is secured at both ends to the tube 16. FIG. 12 shows the telescoping compression element in its initial condition, and FIG. 13 shows the telescoping compression element during an axial impact when the tube 16 is elongated. If desired a tension spring 50 can be provided to restore the distorted tube 16 to the initial condition of FIG. 12 after an impact. The telescoping compression element of these figures can be used in any of the embodiments described above.

Of course, many changes and modifications can be made to the preferred embodiments described above. For example, when the elongated structure is implemented as a rail, two or more rails can be used rather than the single rail described above. The tubes 16 can be formed of a wide variety of materials, and may be non-circular in cross section (e.g. rectangular, oval, or triangular). The compression elements can be shaped either as frames or struts, as described above, or alternately as panels or other shapes designed to resist compression effectively. In some cases, a single compression element can be placed within each tube. In other cases, multiple compression elements may be placed within each tube, for example at varying heights.

Similarly, the guides described above can take many forms, including guides adapted to slide along a cable as well as guides adapted to slide along one or more rails. The guides may or may not include transverse elements, and if so the transverse elements may be shaped differently than those described above. For example, rigid panels may be substituted for the disclosed frames.

As another alternative, a separate guide may be provided for each tube rather than having a single transverse element to which multiple tubes are mounted. Also, there may be a smaller ratio of guides to tubes such that some of the tubes are coupled only indirectly to one or more guides (e.g. via intermediate tubes). In this alternative, two or more tubes that are spaced along the longitudinal axis of the array may have no guide therebetween.

The angle of the compression axes, the number of transverse elements 34 per system, the number of tubes per system, the location of the compression elements within the tubes, and the number of compression elements per tube may all be varied as appropriate for the particular application. Also, it is not essential that every tube include a compression element or that every tube be directly connected to a guide, and selective use of compression elements and/or guides with only some of the tubes is contemplated.

As used herein, the term "tube" is intended broadly to encompass tubes of any desired cross-section. Thus, a tube does not have to be circular in cross-section as in the illustrated embodiment.

The term "set" is used in its conventional way to indicate one or more.

The term "compression element" is intended to encompass a wide variety of structures that effectively resist compressive loads along a compression axis while allowing substantial compression transverse to the compression axis.

The foregoing detailed description has discussed only a few of the many forms that this invention can take. For this reason, this detailed description is intended by way of illustration, and not limitation. It is only the following claims, including all equivalents, that are intended to define the scope of this invention.

What is claimed is:

1. A vehicle impact attenuator comprising:

a rail comprising a side;

a plurality of transverse elements guided for sliding movement along the rail in a longitudinal direction, each transverse element loosely fitted to the rail such that each transverse element is free to twist about a vertical axis by at least ±10° without binding against the rail, and wherein each transverse element cooperates with said side of said rail such that each transverse element is restrained by said rail from being translated a substantial amount in a lateral direction relative thereto; and a plurality of energy absorbing elements disposed between the transverse elements.

2. The invention of claim 1 wherein each transverse element is free to twist about the vertical axis by at least ±20° without binding against the rail.

3. The invention of claim 2 wherein each transverse element is free to twist about the vertical axis by at least ±25° without binding against the rail.

4. A vehicle impact attenuator comprising:

a rail comprising a side;

at least one guide member moveable along said rail in a longitudinal direction between at least a first position and a second position, wherein at least a portion of said guide member is rotatable relative to said rail about a vertical axis by at least ±10° without binding said guide member against said rail as said guide member is moved between at least said first and second positions, and wherein said at least one guide member cooperates with said side of said rail such that said at least one guide member is restrained from translating a substantial amount in a lateral direction relative thereto; and at least one energy absorbing element located adjacent said guide member.

5. The invention of claim 4 wherein said at least one guide member comprises at least a pair of guide members spaced apart along said rail, wherein said at least one energy absorbing element is positioned between said spaced apart guide members.

6. The invention of claim 4 wherein said at least one guide member comprises a transverse element coupled to said at least one energy absorbing element.

7. The invention of claim 4 wherein said rail comprises opposite sides, wherein said at least one guide member comprises a pair of engagement members positioned on said opposite sides of said rail, each of said engagement members having an innermost end spaced apart from one of said opposite sides of said rail respectively such that said guide member can rotate relative to said rail.

8. The invention of claim 7 wherein said rail comprises a vertically oriented central rib defining said opposite sides and a pair of horizontal flanges extending from said opposite sides of said central rib, wherein said engagement members are positioned on said opposite sides of said central rib and below said horizontal flanges, with said innermost ends of said engagement members spaced apart from said opposite sides of said central rib, and wherein said engagement members are engageable with said horizontal flanges to prevent said at least one guide member from dislodging from said rail.

9. The invention of claim 4 wherein said at least one guide member is rotatable relative to said rail about said vertical axis by at least ±20° without binding against said rail.

10. The invention of claim 4 wherein said at least one guide member is rotatable relative to said rail about said vertical axis by at least ±25° without binding against said rail.

11. The invention of claim 4 wherein said at least one guide member extends transversely from said side of said rail.

12. The invention of claim 4 wherein said at least one energy absorbing element comprises a resilient, self-restoring tube.

13. The invention of claim 4 wherein said rail comprises opposite sides, wherein said at least one guide member comprises a pair of engagement members positioned on said opposite sides of said rail, each of said engagement members having an end portion facing one of said opposite sides of said rail respectively, wherein said end portions are shaped to permit rotation of said at least one guide member relative to said rail.

14. The invention of claim 13 wherein said end portions each comprise a curved portion.

15. The invention of claim 13 wherein said end portions each comprises at least one chamfered corner.

16. A method of attenuating the impact of a vehicle comprising:

providing an impact attenuator comprising a rail having a side, at least one guide member moveably coupled to said rail, and at least one energy absorbing element located adjacent said guide member;

impacting said impact attenuator with said vehicle;

moving said guide member along said rail in a longitudinal direction in response to said impacting said impact attenuator with said vehicle; and rotating at least a portion of said guide member relative to said rail about a vertical axis by at least 10° without binding said guide member against said rail as said guide member is moved along said rail in said longitudinal direction; and engaging said side of said rail with said at least one guide member and thereby preventing said guide member from translating a substantial amount in a lateral direction relative to said rail.

17. The method of claim 16 wherein said at least one guide member comprises at least a pair of guide members spaced apart along said rail, and wherein said at least one energy absorbing element is positioned between said spaced apart guide members.

18. The method of claim 16 wherein said at least one guide member comprises a transverse element coupled to said at least one energy absorbing element.

19. The method of claim 16 wherein said guide member comprises a pair of engagement members positioned on opposite sides of said rail, each of said engagement members having an innermost end spaced apart from said rail, wherein said rotating said guide member relative to said rail comprises moving said innermost ends toward said rail.

20. The method of claim 19 wherein said rail comprises a vertically oriented central rib and a pair of horizontal flanges extending from opposite sides of said central rib, wherein said engagement members are positioned on opposite sides of said central rib and below said horizontal flanges, with said innermost ends of said engagement members spaced apart from said central rib, and wherein said engagement members are engageable with said horizontal flanges to prevent said guide member from dislodging from said rail.

21. The method of claim 16 wherein said rotating said at least said portion of said guide member relative to said rail about said vertical axis comprises rotating said at least said portion of said guide member relative to said rail about said vertical axis by at least 20° without binding against said rail.

22. The method of claim 16 wherein said rotating said at least said portion of said guide member relative to said rail about said vertical axis comprises rotating said at least said portion of said guide member relative to said rail about said vertical axis by at least 25° without binding against said rail.

23. The method of claim 16 wherein said guide member extends transversely from opposite sides of said rail.

24. The method of claim 16 wherein said at least one energy absorbing element comprises a resilient, self-restoring tube.

25. The method of claim 16 wherein said impacting said impact attenuator with said vehicle comprises impacting said energy absorbing element with said vehicle.

26. The invention of claim 1 wherein said side is substantially vertical.

27. The invention of claim 4 wherein said side is substantially vertical.

28. The invention of claim 16 wherein said side is substantially vertical.

*29. A roadway crash cushion, comprising:*

*an array of collapsible cells, each cell having an arch in at least opposite portions of the cell;*

*a plurality of guides disposed between the collapsible cells and coupled to the arches on the opposite portions of the cells, wherein the cells extend laterally outwardly from the guides coupled thereto such that the cells are positioned to transfer a lateral impact load applied by a vehicle to the guides; and*

*wherein each guide is guided for sliding along a longitudinal rail member extending along a center longitudinal axis of the crash cushion as the collapsible cells collapse, and wherein each guide cooperates with a side of the rail member such that the guide is restrained by the rail member from being translated in a lateral direction relative thereto.*

*30. The roadway crash cushion of claim 29, wherein the cells comprise an elastomeric material.*

*31. The roadway crash cushion of claim 29, wherein the cells comprise a polyethylene material.*

*32. A roadway crash cushion, comprising:*

*a pair of diaphragms each extending transversely relative to a longitudinal axis along which the roadway crash cushion collapses, the pair of diaphragms moveable relative to each other during an axial impact along the longitudinal axis;*

*a pair of energy absorbing elements disposed between the pair of diaphragms, each of the energy absorbing elements having an arch, wherein the pair of energy absorbing elements extend laterally outwardly from the pair of diaphragms; and*

*wherein each diaphragm is guided for sliding along a longitudinal rail member extending along a center longitudinal axis of the crash cushion as the collapsible energy absorbing elements collapse, and wherein each diaphragm cooperates with a side of the rail member such that the diaphragm is restrained by the rail member from being translated in a lateral direction relative thereto.*

*33. The roadway crash cushion of claim 32 wherein the diaphragms each comprise a rectangular member.*

*34. The roadway crash cushion of claim 32 wherein the energy absorbing elements each comprise an elastomeric material.*

*35. The roadway crash cushion of claim 32, wherein the energy absorbing elements each comprise a polyethylene material.*

*36. The roadway crash cushion of claim 32, wherein the energy absorbing elements flatten along the longitudinal axis when collapsing.*

*37. A roadway crash cushion, comprising:*

*a collapsible, substantially self-restoring portion comprising a plurality of energy absorbing elements each comprising a camber and formed substantially of a resilient polymeric material;*

*a plurality of guides, each of said guides disposed between, and secured to the cambers of, an adjacent pair of energy absorbing elements, wherein the adjacent pairs of energy absorbing elements extend laterally outwardly from the respective guides such that the energy absorbing elements are positioned to transfer a lateral impact load applied by a vehicle to the guides; and*

*a longitudinal, ground-mounted rail member extending along a center axis of the crash cushion and having a side, wherein the guides cooperate with the side of the rail such that the guides are restrained by the rail from being translated in a lateral direction relative thereto.*

*38. The roadway crash cushion of claim 37, wherein the resilient polymeric material comprises polyethylene.*

*39. The roadway crash cushion of claim 37, wherein the camber provides for the energy absorbing element to become elongated transverse to a longitudinal axis and flattened along the longitudinal axis.*

*40. The roadway crash cushion of claim 37, wherein the guide comprises a laterally extending plate member disposed under an elevated surface of the rail.*

*41. The roadway crash cushion of claim 37 wherein the guides are secured to the energy absorbing elements with bolts passing through holes in the energy absorbing elements.*

* * * * *